United States Patent [19]

Anania

[11] 3,844,009
[45] Oct. 29, 1974

[54] CUTTER TOOL

[76] Inventor: James A. Anania, 801 North 6th St., Newark, N.J. 07107

[22] Filed: Dec. 9, 1971

[21] Appl. No.: 206,312

[52] U.S. Cl. ............................ 29/97, 29/98
[51] Int. Cl. .............................. B26d 1/00
[58] Field of Search .................... 29/98, 97, 101

[56] References Cited
UNITED STATES PATENTS

| | | | |
|---|---|---|---|
| 3,063,318 | 11/1962 | Schloppal | 29/98 |
| 2,950,524 | 8/1960 | Frommelt | 29/96 |
| 1,838,520 | 1/1931 | Archer | 29/96 |
| 530,793 | 12/1894 | Odgers | 29/105 |
| 3,320,655 | 5/1967 | Schweitzer et al. | 29/105 |

FOREIGN PATENTS OR APPLICATIONS 559,772  11/1943  France .................... 29/96

Primary Examiner—Andrew R. Juhasz
Assistant Examiner—Leon Gilden
Attorney, Agent, or Firm—Jerry R. Seiler

[57] ABSTRACT

A cutter tool having 8 cutting tips. The cutting tips are arranged in pairs, each pair being carried by a support block removably secured to a circular body. The tool is particularly adapted for use with a tool holder of the type affording angular adjustment of the tool to set a selected cutting tip in the cutting position without removal of the tool holder from the supporting tool post.

3 Claims, 3 Drawing Figures

PATENTED OCT 29 1974  3,844,009

INVENTOR.
JAMES A. ANANIA

CUTTER TOOL

BACKGROUND OF THE INVENTION

My U.S. Pat. No. 2,799,917, dated July 23, 1957 and entitled Cutter Tool Assemblies, discloses a tool holder carrying a cutter tool having a number of cutting tips, said tool being angularly adjustable in the tool holder selectively positioning a cutting tip in position for use. A cutter tool made in accordance with this invention is adapted for use with tool holders of this type and carries eight cutting tips, thereby increasing its versitility of use and minimizing machine down time.

SUMMARY OF THE INVENTION

A circular body has four longitudinally-extending slots formed in the peripheral surface thereof, said slots being spaced 90 degrees apart. The slots receive generally-rectangular blocks, each block having cutting tips brazed to the end portions thereof. Each block includes an integral stem which extends into a radial hole formed in the circular body, said stem being secured to the body by means of a set screw.

An object of this invention is the provision of a cutter tool having eight cutting tips.

An object of this invention is the provision of an eight-way cutter tool comprising a circular body carrying four pairs of cutting tips, each pair of cutting tips being brazed to end portions of blocks which are removably secured to the body and spaced 90 degrees apart.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENT

Figure 1:
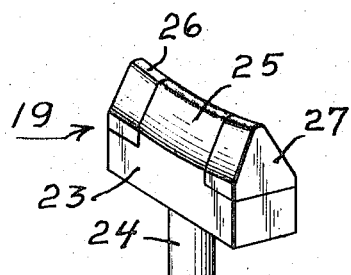
FIG. 1 is an isometric view of a cutter tool made in accordance with this invention, one of the blocks carrying a pair of cutting tips being shown detached from the tool body.
Figure 3:
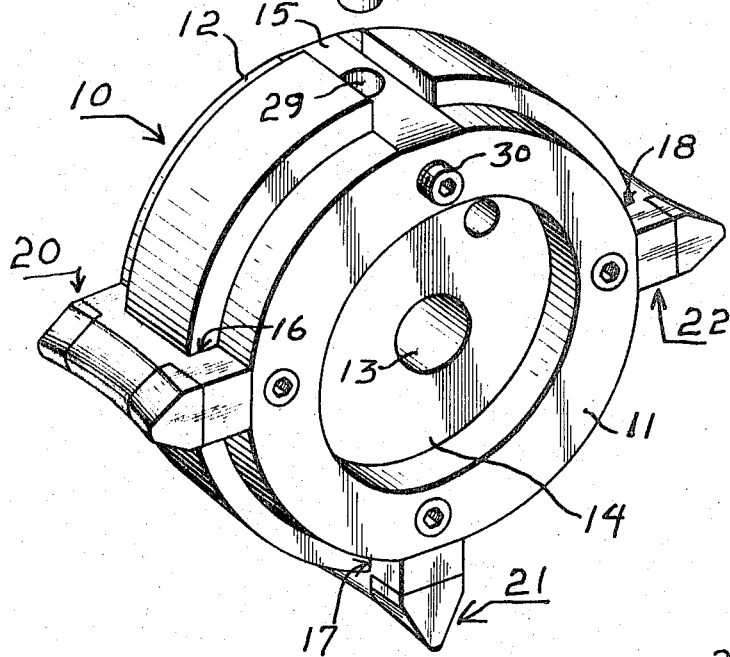
FIG. 3 is an end elevational view.
Figure 3:
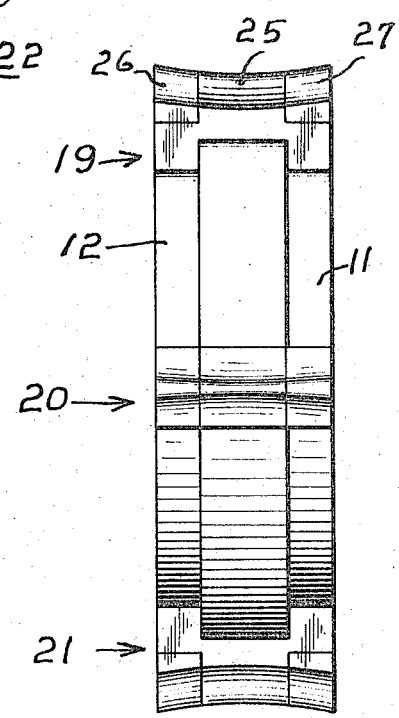
Figure 2:
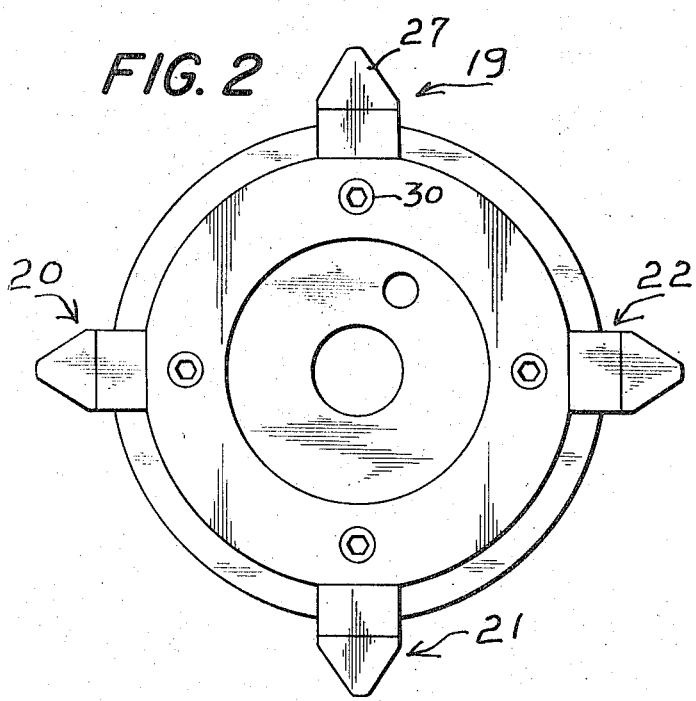
FIG. 2 is a front elevational view.

Referring now to the drawings, the cutter tool comprises a circular body 10 having reduced diameter end portions 11 and 12 and a central hole 13 terminating in identical, opposed bores, the forward bore 14 being visible in FIG. 1. Four longitudinally-extending slots 15 - 18 are formed in the peripheral surface of the body, said slots being spaced 90° apart and having flat bottom walls. Four pairs of cutting tips are carried by the four generally-rectangular blocks 19 - 22. Referring specifically to the block 19, such block comprises a body 23, said body having a flat bottom with an integral stem 24 extending therefrom, and an upper portion 25 which is tapered. The end portions of the block are recessed to provide a seat and a shoulder for the cutting tips 26 and 27, having generally triangular configurations which tips are brazed to the block. The apexes of the cutting tips and the tapered block portion 25 are ground to lie on a common circle to form a concave configuration, thereby to provide a clearance or relief for material during the cutting operation. The stem 23 fits snugly into a radial hole 29 formed in the circular body 10, and the block is secured in place by means of a set screw 30, the width of the block being such that it also fits snugly in the longitudinal slot 15. The other three blocks 20 - 22 are of similar construction and similarly secured to the circular body.

Having now described the invention what I desire to protect by Letters Patent is set forth in the following claims.

I claim:

1. A cutter head comprising,
   a. a circular body having a plurality of longitudinally-extending slots formed in the peripheral surface,
   b. a corresponding number of generally-rectangular blocks, each block carrying a pair of cutting tips and being positioned in one of the slots, wherein each block has a tapered portion and recessed ends, wherein the cutting tips are of generally triangular configuration and brazed to the said recessed ends, and wherein the apexes of the cutting tips and said tapered portion lie on a common circle and present a concave configuration with respect to the said circular body, and
   c. cooperating means on the said body and blocks for securing the blocks to the body.

2. The invention as recited in claim 1, wherein the said slots have flat bottom walls, wherein the said blocks have flat bottom surfaces and a length substantially equal to the width of the circular body, and wherein the said blocks have widths so that they fit snugly within the slots.

3. The invention as recited in claim 2, wherein the said cooperating means comprises radial holes formed in the circular body and terminating in the bottom walls of said slots, integral stems on the blocks and extending into the said holes, and set screws carried by the circular body and having ends in engagement with the said stems.

* * * * *